Dec. 18, 1928.  1,695,707
H. H. BOYCE
ILLUMINATING MEANS FOR MOTOR HEAT INDICATORS
Filed Sept. 27, 1923    2 Sheets-Sheet 1
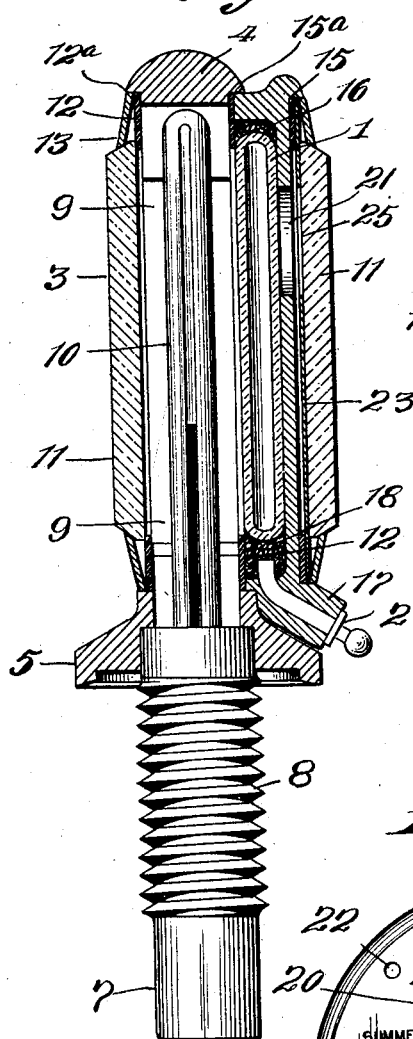
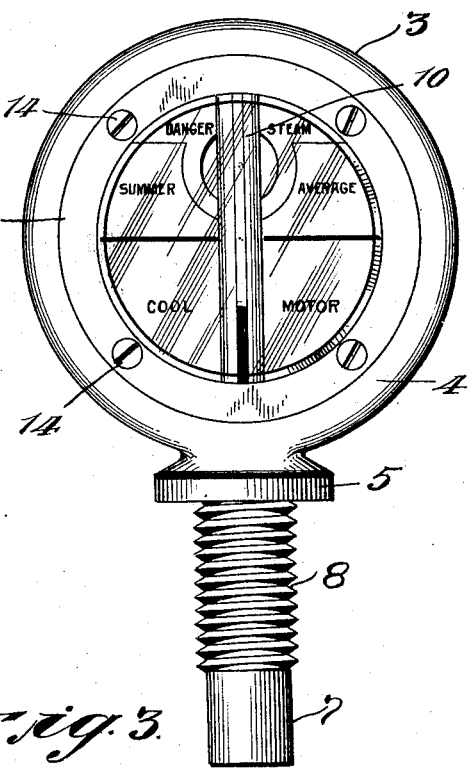
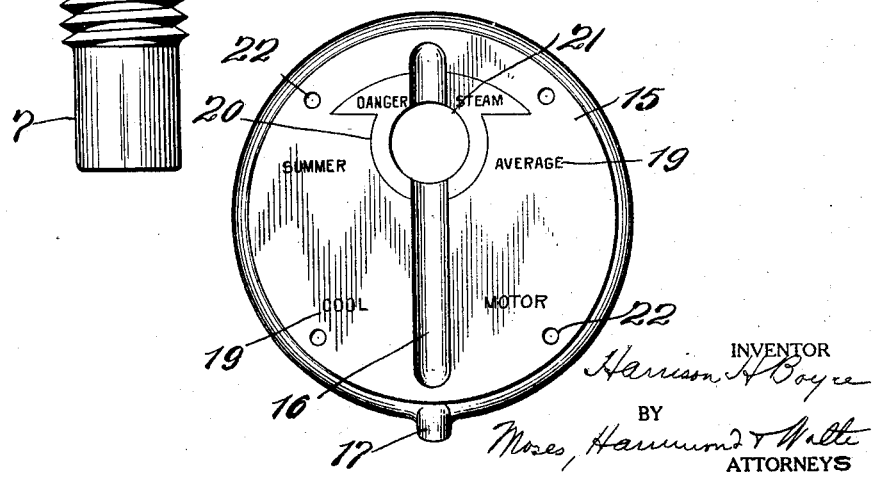
INVENTOR
Harrison H. Boyce
BY
Moses, Hammond & Walte
ATTORNEYS Dec. 18, 1928.
H. H. BOYCE
1,695,707
ILLUMINATING MEANS FOR MOTOR HEAT INDICATORS
Filed Sept. 27, 1923   2 Sheets-Sheet 2
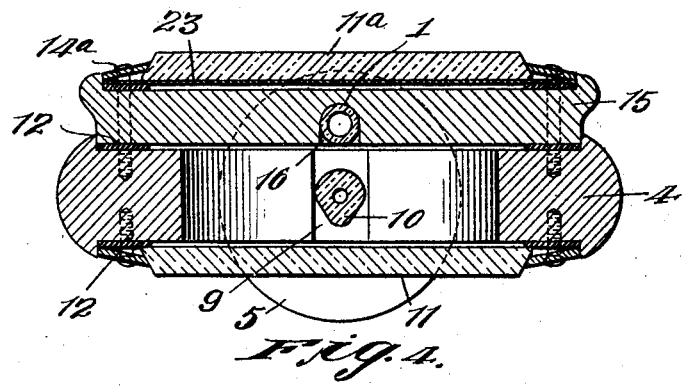
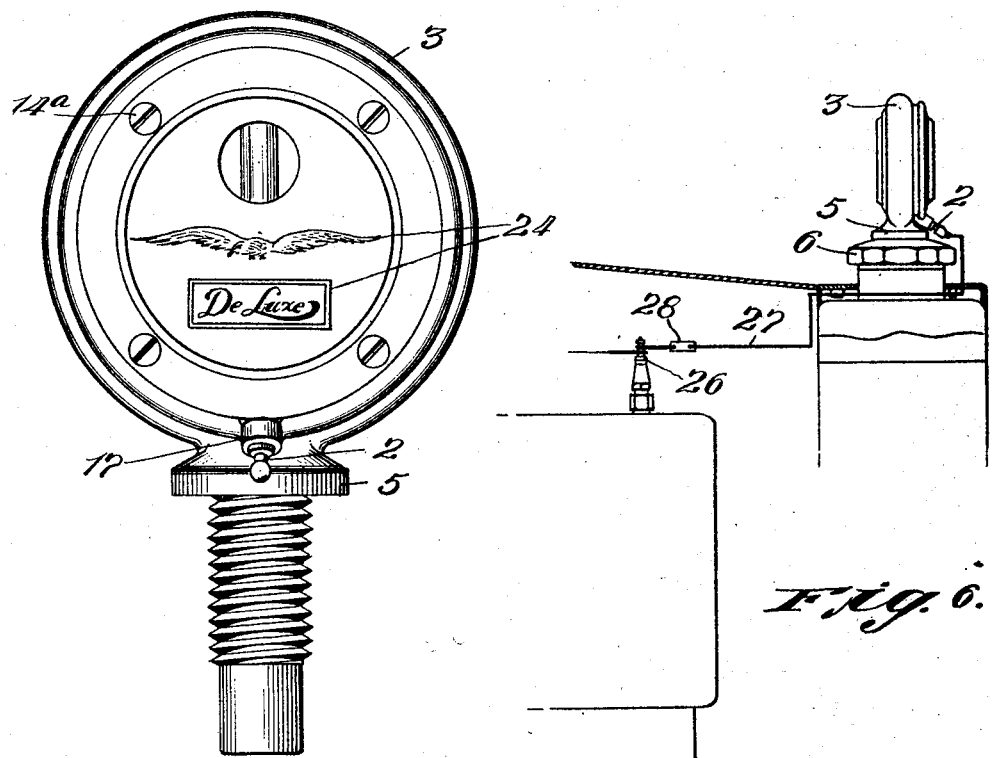
Harrison H. Boyce
INVENTOR
BY Moses, Hammond & Wolt
ATTORNEYS Patented Dec. 18, 1928.

1,695,707

UNITED STATES PATENT OFFICE.

HARRISON H. BOYCE, OF JERICHO, NEW YORK.

ILLUMINATING MEANS FOR MOTOR-HEAT INDICATORS.

Application filed September 27, 1923. Serial No. 665,254.

This invention relates to illuminating devices, and more particularly to illuminating devices for use in illuminating instruments for indicating the thermal conditions of internal combustion engines of motor vehicles and the like.

The instruments in most general use as motor heat indicators for automobiles comprise a temperature responsive indicating device mounted on the radiator cap at the front of the car. This location of the instrument is peculiarly advantageous for observation by the driver as it does not require him to take his eyes from the road in order to observe the instrument. With certain arrangements of the automobile lights and under some road conditions, however, its indications are in some instances difficult to read at night.

It is an object of the present invention to provide means for illuminating motor heat indicators of the type described, to enable them to be read at night, which can be readily applied to the indicators now in use.

Other objects are to provide an illuminating device which can be mounted upon the temperature indicator, without substantially changing its appearance or decreasing its ornamental effect, which will not interfere with the driver's vision of the road at night and will illuminate the entire indicator and scale to a uniform intensity.

Various other objects and advantages will appear as the description proceeds.

Referring now to the drawings which illustrate one embodiment of the invention as applied to a motor heat indicator in common use, Fig. 1 is a front elevation of such an indicator with the device applied thereto.

Fig. 2 is a longitudinal sectional view of the form of embodiment shown in Fig. 1.

Fig. 3 is a front elevation of the scale plate showing the groove for the illuminating device therein.

Fig. 4 is a cross sectional view of the indicator and device looking down in Fig. 1.

Fig. 5 is a rear view.

Fig. 6 is a part diagrammatic view showing the indicator and illuminating device mounted on the radiator of an internal combustion engine.

The embodiment of the instrument chosen to illustrate the invention comprises a motor heat indicator 3 of a well-known form now in common use, in which the crystal ordinarily placed at the rear of the indicator has been removed and replaced by the disc 15 which serves as a housing for the illuminating device to be described.

The illuminating device consists of a closed tube 1, containing a rarefied gas, as for example neon, which is adapted to glow when subjected to a potential difference of the intensity ordinarily employed for the spark plugs of internal combustion engines; and an electrode 2 for connecting the tube to a suitable source of electrical potential. This tube is illustrated as being applied to a motor heat indicator 3 of well known form comprising an annular frame 4 with a base 5, adapted to rest upon the top of the radiator cap 6. A suitable projection or housing 7 extends from the frame 4 through the radiator cap and into the radiator, and is screw-threaded at 8 for the purpose of receiving a nut to hold the frame 4 upon the radiator cap.

Extending from inside the projection 7 into the opening 9 in the frame 4 is a glass thermometer tube 10, containing an expansible fluid such as alcohol, which constitutes the indicating element of the instrument.

The front of the frame 4 is closed by a transparent crystal 11, the edges of which rest upon a suitable packing washer 12, placed in an annular recess 12$^a$ formed in the frame, while the crystal is held in place by a ring 13, which overlaps the edges of the crystal and is attached to the frame by the screws 14.

In the instruments of this character now in use are a suitably marked dial plate placed behind the glass tube 10 in an annular recess 15$^a$ formed in the back of the frame, and behind the dial plate a name plate bearing suitable insignia is inserted. A crystal similar to the crystal 11 is placed over the name plate and held in place by a ring, like the ring 13. Thus when the instrument is viewed from the front, the glass tube is seen with the dial plate behind it, while when viewed from the other side the name plate with the insignia is visible. The present invention provides a means whereby the illuminating devices may be added to these instruments without substantially changing the appearance thereof when viewed from either front or rear. This is accomplished in the form of the invention illustrated by removing the rear retaining ring and crystal together with the dial plate and name plate and substituting the construction to be described.

In applying the illuminating means to an instrument of the character described, the rear of the frame 4 is closed by a disc of insulating material 15, which may be bakelite or the like. This disc is of sufficient thickness to enclose or house the illuminating tube 1, and is provided for that purpose with a receptacle in the form of a vertical groove 16, a hollow extension 17 being provided to permit the electrode 2 to be inserted into the frame and to insulate it from the same.

The top of the tube 1 is held in place by a packing washer 12 inserted between the rear of the frame 4 and the disc 15, and by suitable packing in the top of the groove 16, and the bottom rests upon a suitable packing and conductive material 18, as for example, steel wool, so as to prevent breaking of the tube 1 due to the vibrations of the temperature indicator and so as to produce the desired electrical excitation of the gas within the tube. In addition to housing the illuminator tube 1, the disc 15 may have inscribed upon its face suitable letters 19 and designs 20, such as illustrated in Fig. 3, so that the face of the disc serves also as a dial or scale by which the various temperature changes recorded by the heat indicator may be read and interpreted.

An opening 21 is provided through the disc 15 so as to render the column of fluid in the tube 10 very distinctly visible to the driver when due to abnormal temperature conditions the column rises to such a height as to enter the lower limits of the opening 21.

The rear face of the disc 15 is covered by a crystal 11ª which rests against a packing washer 12 and is held in place by a ring 13 and screws 14ª which also pass through the holes 22 in the disc 15 and into the frame 4 to hold the disc and crystal in place.

If desired a nameplate 23 may be inserted between the disc 15 and the crystal 11ª and carry a trade-mark or design 24 which is visble from the rear of the instrument. The nameplate 23 is provided with an opening 25 in registry with the opening 21 in the disc 15.

In the use of the device the indicating instrument is positioned on the radiator cap 6, as illustrated in Fig. 6, and the electrode 2 is connected to a source of suitable potential difference, as for example, the spark plug 26, by the conductor 27. A condenser 28 is introduced into the conductor 27 to prevent leakage of the current and grounding of the plug 26 and to permit the use of uninsulated conductors in certain instances. Where a well-insulated conductor is used, the condenser may be omitted. By this arrangement, the illuminator 1 is caused to glow each time the spark plug is subjected to a potential difference for producing a spark in the cylinder.

At high speeds the glowing of the illuminator produces a continuous light which illuminates the thermometer tube 10 and the scale 19 and 20 so as to enable the same to be easily read from the driver's seat at night, and at the lower speeds the intermittent flashes serve to attract attention to the heat indicator so that its indications will not pass unnoticed.

While the invention has been described as applicable to the heat indicators now in use, it is, of course, obvious that the invention may as readily be applied to the heat indicators to be manufactured in the future.

In compliance with the patent statutes a specific embodiment of the invention and mode of applying the same has been described, but it is to be understood that the invention is not limited to the embodiment shown or the application described, but that changes may be made without departing from the scope of the invention as defined in the accompanying claims.

What I claim is:

1. In combination, an instrument for indicating the heat of a vehicle motor, said instrument comprising a temperature indicator, a ring shaped casing enclosing said indicator, and an attachment including an elongated tube containing a rarefied gas adapted to glow when subjected to spark plug potential, a block, an open groove in the block for partially enclosing said tube, a rear crystal, a name plate interposed between said crystal and said block, and means passing through the block at a plurality of points for securing the block, the name plate and the crystal all to the rear wall of said casing.

2. In a heat indicating means for internal combustion engines, the combination of a frame adapted to be secured to the radiator cap of the engine, a means in the frame for indicating the heat of the engine, a crystal over the front of the frame, a scale plate at the rear of the frame and an illuminating device in the plate, a crystal at the rear of the plate and means passing through the plate and into the frame and holding both the crystal and plate in the frame.

3. In a heat indicating means for internal combustion engines, the combination of a frame adapted to be secured to the radiator cap of the engine, means in the frame for indicating the heat of the engine, a disk at the rear of the frame and filling the same behind the heat indicating means, an open groove in the disk, an illuminating tube adapted to glow when subjected to spark plug potential in the groove, means passing through the disk and into the frame to secure the disk in the frame, and means to subject the glow tube to spark plug potential.

4. In combination, an internal combustion engine having a source of spark plug potential, the device comprising a tube containing a heat responsive element and a frame, a scale plate within the frame behind said tube, a groove in the plate, a tube adapted to glow when subjected to spark plug potential mounted in the groove behind the tube containing the heat responsive element, a circular opening near the top of the plate, a name plate behind the scale plate, a crystal covering the name plate, means passing through the scale plate and holding the crystal, the name plate and the scale plate all on the frame, and means outside the frame to connect the glow tube to a spark plug of the engine.

In testimony whereof I have affixed my signature to this specification.

HARRISON H. BOYCE.